US010594685B2

(12) United States Patent
Peddada et al.

(10) Patent No.: US 10,594,685 B2
(45) Date of Patent: Mar. 17, 2020

(54) USER SELECTED KEY AUTHENTICATION

(71) Applicant: salesforce.com, inc., San Francisco, CA (US)

(72) Inventors: Prasad Peddada, Alameda, CA (US); Taher Elgamal, San Francisco, CA (US); Gursev Singh Kalra, Foster CIty, CA (US)

(73) Assignee: salesforce.com, inc., San Francisco, CA (US)

( * ) Notice: Subject to any disclaimer, the term of this patent is extended or adjusted under 35 U.S.C. 154(b) by 198 days.

(21) Appl. No.: 15/788,732

(22) Filed: Oct. 19, 2017

(65) Prior Publication Data

US 2019/0124066 A1  Apr. 25, 2019

(51) Int. Cl.
  *H04L 29/06* (2006.01)
  *G06F 21/31* (2013.01)
(52) U.S. Cl.
  CPC ............ *H04L 63/083* (2013.01); *G06F 21/31* (2013.01); *H04L 63/0838* (2013.01); *H04L 63/0853* (2013.01); *H04L 63/0861* (2013.01); *H04L 63/166* (2013.01)
(58) Field of Classification Search
  CPC .................................................. H04L 63/083
  USPC ............................................................. 726/7
  See application file for complete search history.

(56) References Cited

U.S. PATENT DOCUMENTS

| 8,255,696 B2 * | 8/2012 | Florencio ................ | G06F 21/46 705/64 |
| 9,020,121 B1 * | 4/2015 | Dhanda ................... | H04M 3/42 379/127.06 |
| 9,521,551 B2 * | 12/2016 | Eisen ..................... | H04W 12/08 |
| 10,299,118 B1 * | 5/2019 | Karachiwala ......... | H04W 12/06 |
| 2014/0282495 A1 * | 9/2014 | Chico de Guzman Huerta .......... | G06F 8/61 717/177 |

(Continued)

FOREIGN PATENT DOCUMENTS

EP    2940618    11/2015

OTHER PUBLICATIONS

International Searching Authority—European Patent Office, "International Search Report and Written Opinion", issued in connection with International Patent Application No. PCT/US2018/056306, dated Jan. 7, 2019 (13 pages).

*Primary Examiner* — Harris C Wang
(74) *Attorney, Agent, or Firm* — Holland & Hart LLP

(57) ABSTRACT

Methods, systems, and devices for user authentication are described. A user may attempt an authentication procedure when accessing an application or cloud platform. When the user requests access to the application or cloud platform, a server may determine one or more unique identifiers to display at a first application for the user, and the user may select one of the unique identifiers. The server may then display unique identifiers (e.g., in some cases, the same unique identifiers) at a second application associated with the user. The user may verify that the selected unique identifier is displayed on the second application, and may select the same unique identifier in the second application. Additionally, the user may input a user-specific identifier to confirm their identity. The server may authenticate the user's identity if the user selected matching unique identifiers, and if the user-specific identifier matches an expected identifier for the user.

20 Claims, 11 Drawing Sheets

(56) References Cited

U.S. PATENT DOCUMENTS

| | | | |
|---|---|---|---|
| 2016/0036807 A1* | 2/2016 | Knauss | G06F 16/9535 |
| | | | 726/7 |
| 2016/0191515 A1 | 6/2016 | Kim et al. | |
| 2016/0248752 A1* | 8/2016 | Blinn | H04L 63/083 |
| 2019/0124066 A1* | 4/2019 | Peddada | H04L 63/083 |

* cited by examiner

USER SELECTED KEY AUTHENTICATION

FIELD OF TECHNOLOGY

The present disclosure relates generally to database systems and data processing, and more specifically to user selected key authentication.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, a user may need to authenticate themselves before accessing the cloud platform, a database, or some application. By authenticating themselves, the user may gain authorization to access the cloud platform, database, or application. Typically, the user may authenticate themselves via a username-password pair. However, more complex passwords may be difficult to remember for the user, or the user may utilize the same password for several different applications. Additionally, stored passwords in the cloud platform may be subject to compromise (e.g., identity theft by an unauthorized user). More efficient techniques for user authentication are desired.

DETAILED DESCRIPTION

Figure 1:
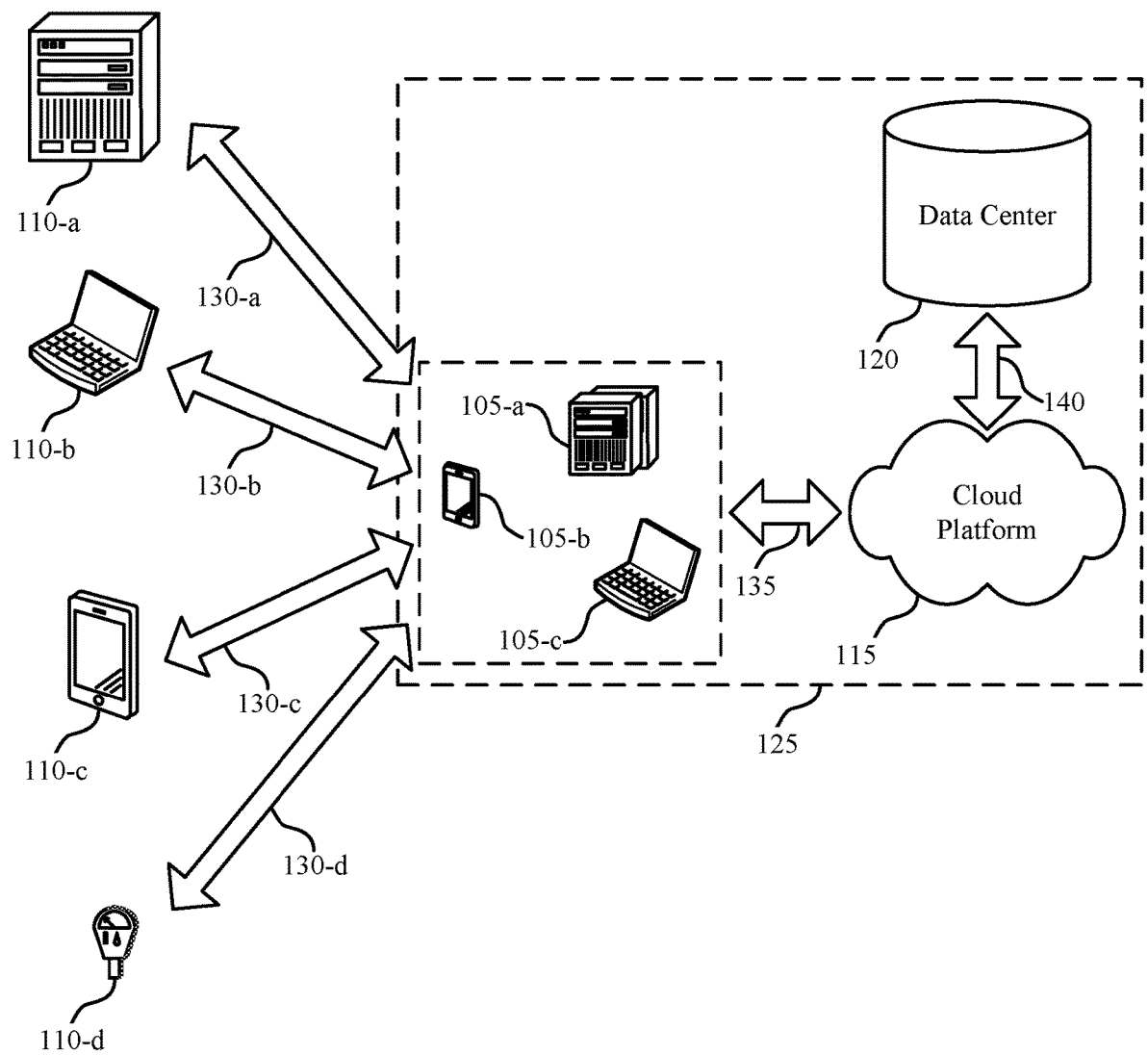
FIG. 1 illustrates an example of a system for user authentication that supports user selected key authentication in accordance with aspects of the present disclosure.

In some database systems, a cloud platform may implement an authentication procedure to verify a user attempting to access the cloud platform is authorized for access, to verify the identity of the user, or both. In some cases, the authentication procedure may incorporate a unique identifier rather than a password that the user has to remember. The unique identifier may enhance the security of the authentication procedure and reduce the complexity from the user perspective. For example, the user may not have to remember a complex password or change their password periodically (e.g., every three months). Additionally, the cloud platform or a server associated with the cloud platform may not have to store the password in memory, preventing a potential leak of information (e.g., from a hacker). Additionally or alternatively, the user and cloud platform may utilize a challenge-response based one-time password (OTP) for a login or authentication procedure. The OTP may be generated each time the user attempts to login to the cloud platform.

In some cases, a user may initially request access to the cloud platform on a first application using a user device (e.g., a laptop or a smartphone). The cloud platform may include an identity server that determines a unique identifier in response to the access request. For example, the identity server may generate one or more unique identifiers (e.g., random strings of characters) that are displayed at the first application. The user may then select one of the unique identifiers. The identity server may display a set of unique identifiers (e.g., in some cases, the same unique identifiers) at a second application (e.g., on a second user device). The user may verify that the selected unique identifier is included in the displayed set of unique identifiers, and may select the same unique identifier as previously selected in the first application. Additionally, in some cases, the second application may prompt the user to input a user-specific identifier (e.g., a personal identification number (PIN), a biometric input, a password, etc.). If the same unique identifier is selected in both applications and the input user-specific identifier is correct, the identity server may authenticate the identity of the user, and may grant the user access to the cloud platform. In some cases, the identity server may generate the unique identifiers when generating an OTP for the user to login.

In some exemplary embodiments, the identity server may generate one unique identifier and display it on the first application. The user may then select the displayed unique identifier from a set of unique identifiers on the second application for the authentication procedure. Alternatively, the user may input a unique identifier on the first application and verify that the same unique identifier is displayed at the second application for the authentication procedure. The unique identifier may include numbers, text characters, images, sounds, or a combination thereof.

In some cases, a malicious user may attempt to access the user's account on the cloud platform. For example, the malicious user may request access to the cloud platform at the same time as the user, effectively disguising an authentication request by the malicious user as an authentication request from the user (i.e., using a man-in-the-middle attack). However, the identity server may develop different unique identifiers for the malicious user than for the user.

The user may then determine that the unique identifiers displayed on the first application do not match the unique identifiers on the second application, or that a selected unique identifier in the first application is not displayed in the second application (e.g., the unique identifiers displayed on the second application correspond to the unique identifiers or a selected unique identifier for the malicious user). As such, the user may send a rejection message to the identity server (e.g., by selecting not to authorize the request), which may then be sent to an application used by the malicious user, denying access to the malicious user.

Aspects of the disclosure are initially described in the context of an environment supporting an on-demand database service. Further aspects of the disclosure are described with respect to a user authentication procedure and an attempted man-in-the-middle attack. Additionally, examples of unique identifier configurations and a process flow are described with respect to aspects of the disclosure. Aspects of the disclosure are further illustrated by and described with reference to apparatus diagrams, system diagrams, and flowcharts that relate to user selected key authentication.

FIG. 1 illustrates an example of a system 100 for cloud computing that supports user selected key authentication in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, a cloud client 105 or a contact 110 may attempt an authentication procedure when accessing cloud platform 115. Some systems may implement a username-password pair for authentication. However, using username-password pairs may result in unnecessarily additional security risks and complex procedures for authentication. System 100 may provide a more efficient authentication procedure that does not store a username-password pair in a data center 120 or require the user to input a complex password.

For example, when the cloud client 105 or contact 110 requests access to the cloud platform 115, an identity server in the data center 120 may determine one or more unique identifiers to display at the cloud client 105 or contact 110 on a first application. In some cases, the identity server may generate the unique identifiers as part of a generation process for an OTP. If multiple unique identifiers are displayed, a user at the cloud client 105 or contact 110 may choose one of the unique identifiers. The identity server may then display the same unique identifiers at a second application associated with the user (e.g., at a second cloud client 105 or contact 110 operated by the user). The user may verify the same unique identifiers are shown on the first and second applications and choose the same unique identifier on the second application as chosen on the first application. Additionally, in some cases, the user may input a user-specific identifier (e.g., a PIN, a biometric input, a password, etc.) to confirm the identity of the user. The identity server may then determine that the user selected matching unique identifiers in the two applications, and that the input user-specific identifier matches an expected user-specific identifier for the first or second application, and may grant user access to the cloud platform 115 or an application supported by the cloud platform 115.

Figure 2:
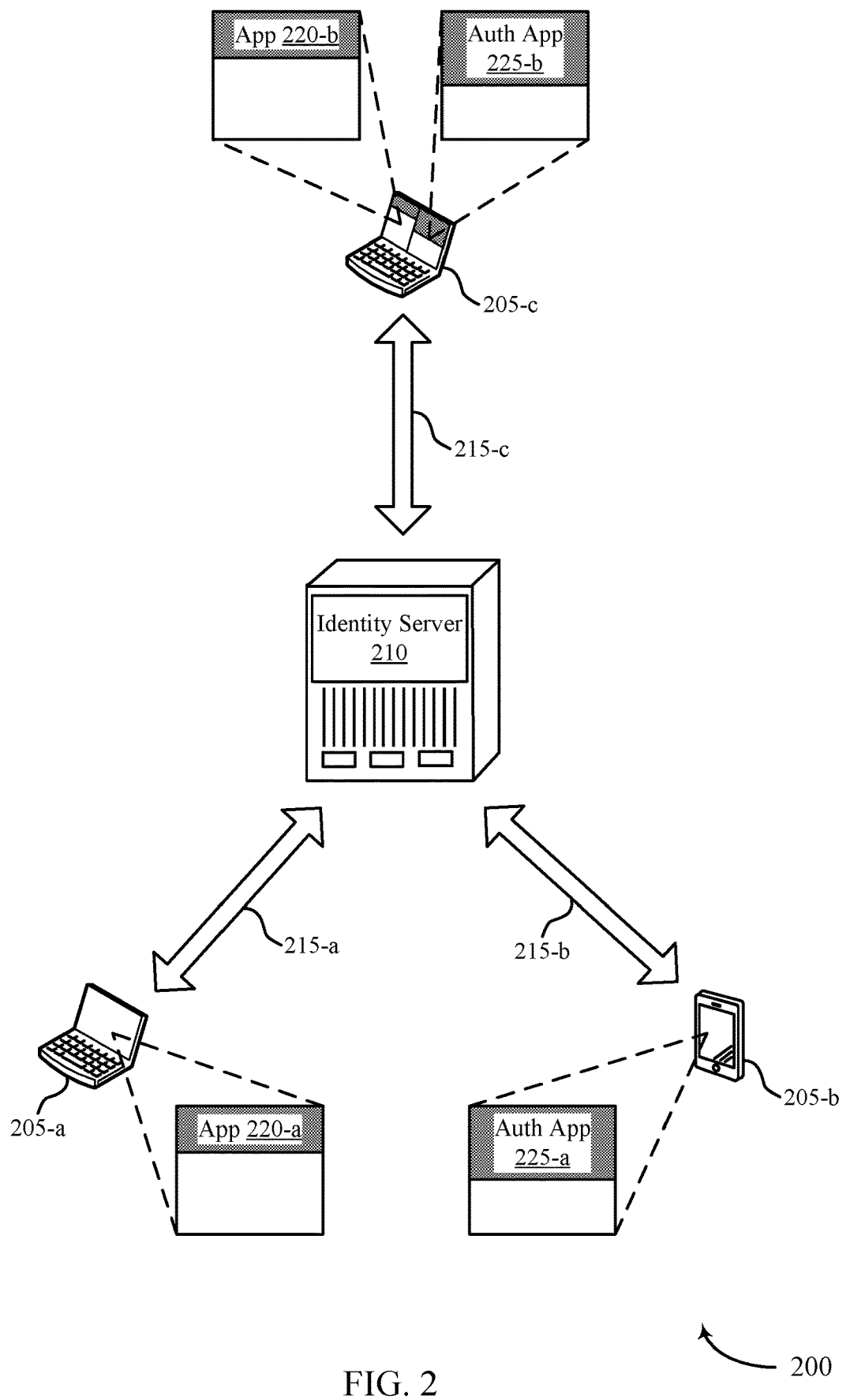
FIG. 2 illustrates an example of a user authentication procedure that supports user selected key authentication in accordance with aspects of the present disclosure.

FIG. 2 illustrates an example of a user authentication procedure 200 that supports user selected key authentication in accordance with various aspects of the present disclosure. The authentication procedure 200 may include multiple user devices 205, which may be examples of cloud clients 105 or contacts 110 as described with reference to FIG. 1. Additionally, user devices 205 may communicate with an identity server 210, which may be a component of the subsystem 125 as described with reference to FIG. 1. For example, the identity server 210 may be an example of an application server, a database server, a server cluster, or some similar device or group of devices supporting user authentication services. The identity server 210 may interact with or host applications 220 and 225, both of which may include user interfaces at one or more user devices 205. In some cases, user devices 205 may communicate with identity server 210 over communication links 215. The user authentication procedure 200 may provide authentication for a user operating a user device 205, or may grant the user device 205 access to an application or a cloud platform associated with the identity server 210.

A user operating user device 205-a (e.g., in some cases, a desktop computer, a laptop computer, a mobile device, etc.) may request access to a cloud platform on a first application 220-a. In some cases, requesting access to the cloud platform may involve requesting access or authentication through a login process or identity verification process at first application 220-a. Identity server 210, as part of the cloud platform, may interact with or host applications 220 and 225, and may provide authentication and access services for user devices 205. A user may send an access or authentication request to identity server 210 from user device 205-a over communication link 215-a, for example, by selecting to login to first application 220-a. Based on the access or authentication request, identity server 210 may determine one or more unique identifiers (e.g., random strings of characters) to display at first application 220-a. For example, identity server 210 may generate the one or more unique identifiers based on an identifier generation function, which may take one or more parameters of the request as inputs, or may determine the one or more unique identifiers based on a table in memory and a random or pseudo-random selection process (e.g., a random number generator, a random nonce, etc.). In some cases, identity server 210 may generate a challenge-response based OTP for the user to utilize for a login procedure (e.g., at a second application 225-a). Identity server 210 may generate the unique identifiers as an extension on the generation process for the OTP. Identity server 210 may send the unique identifiers or indications of the unique identifiers to user device 205-a over communication link 215-a. In some cases, identity server 210 and user devices 205 may implement transport layer security (TLS) protocols when sending information over communication links 215 to provide protection for the information.

User device 205-a may display the received one or more unique identifiers, for example, in a user interface for first application 220-a. The user may then select one of the unique identifiers displayed in first application 220-a on user device 205-a. User device 205-a may send an indication of the selected unique identifier to identity server 210 (e.g., over communication link 215-a utilizing TLS). In some cases, identity server 210 may send, over communication link 215-b, an additional one or more unique identifiers to be displayed at user device 205-b (e.g., a mobile device associated with the user). User device 205-b may display the received unique identifiers—which, in some cases, may correspond to the same one or more unique identifiers displayed at user device 205-a—in a user interface for a second application 225-a (e.g., an authentication application). The unique identifiers displayed by user device 205-b may contain the selected unique identifier, based on identity server 210 receiving the indication of the selection from user device 205-a. The user may select the same unique identifier in second application 225-a as selected previously in first application 220-a. In some cases, the user may additionally verify that the unique identifiers match for both applications 220-a and 225-a (e.g., if identity server 210 is configured to use the same set of unique identifier in applications 220-a and 225-a). User device 205-b may send, to identity server 210, an indication of the unique identifier selected by the user for second application 225-a. Identity server 210 may determine whether the unique identifier selected for first application 220-a and second application 225-a match (i.e., are the same unique identifier or indicate the same unique identifier), and may authenticate or grant the user access at first application 220-a on user device 205-a if identity server 210 verifies a match.

Additionally, the second application 225-a may prompt the user to input a user-specific identifier (e.g., in order for the user to view the display of the unique identifiers at second application 225-a). The user may input a user-specific identifier (e.g., a PIN, a biometric input, a password, etc.) on the second application 225-a. User device 205-b may send the user-specific identifier to identity server 210 for verification (e.g., based on a stored user-specific identifier associated with the user, user device 205-b, or both). In some cases, the information for the verification process of the matching unique identifiers and the user-specific identifier may be sent between user device 205-b and identity server 210 utilizing TLS protocols. Identity server 210 may determine that the user selected matching unique identifiers and that the user-specific identifier matches an identity for the user, and may grant access to the cloud platform for the user based on the determination.

In some cases, identity server 210 or some other application server may run first application 220-a on user device 205-a, and identity server 210 may run second application 225-a on a different user device 205, such as user device 205-b. Alternatively, identity server 210 or another application server may run both first application 220-b and second application 225-b on a same user device 205-c (e.g., in different windows of a web browser or in different applications). In such cases, identity server 210 may send and receive information to and from applications 220-b and 225-b over communication link 215-c (e.g., implementing TLS protocols). Alternatively, identity server 210 may be an example of an application or a component of user device 205-c, and all of the above described operations may occur internally within user device 205-c.

In some cases, identity server 210 may determine one unique identifier and display it on a first application 220, and may display a set of unique identifiers including the determined unique identifier on a second application 225 (e.g., the authentication application). The user may then select, in the second application 225, the unique identifier displayed in the first application 220 from the set of unique identifiers displayed in the second application 225. Alternatively, the user may input a unique identifier on the first application 220 and verify that the same unique identifier is displayed at the second application 225 for the authentication procedure. The unique identifier may include numbers, text characters, images, sounds, or a combination thereof.

Figure 3:
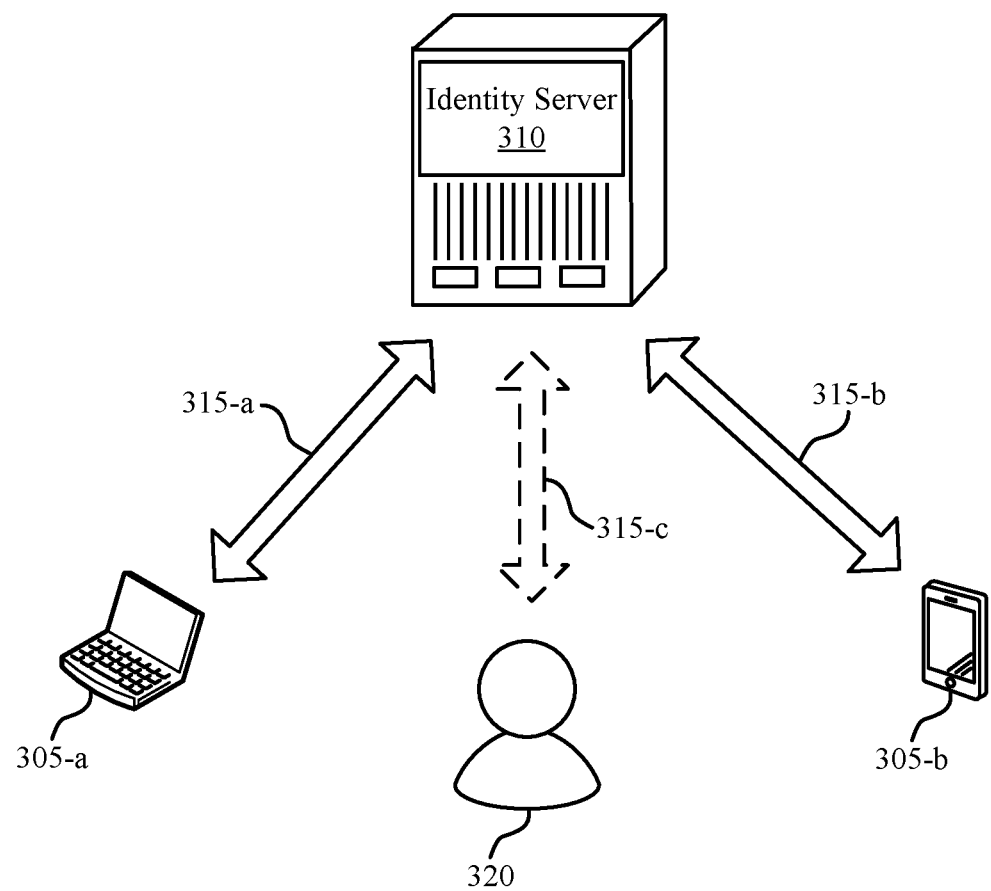
FIG. 3 illustrates an example of an attempted man-in-the-middle attack that supports user selected key authentication in accordance with aspects of the present disclosure.

FIG. 3 illustrates an example of an attempted man-in-the-middle attack 300 that supports user selected key authentication in accordance with various aspects of the present disclosure. The attempted man-in-the-middle attack may include one or more user devices 305, which may be examples of cloud clients 105 or contacts 110 as described with reference to FIG. 1 and user devices 205 as described with reference to FIG. 2. Additionally, user devices 305 may communicate with an identity server 310, which may be a component of the subsystem 125 as described with reference to FIG. 1 or an example of identity server 210 as described with reference to FIG. 2. In some cases, user devices 305 may communicate with identity server 310 over communication links 315. The attempted man-in-the-middle attack 300 may include a malicious user 320, which may also be an example of a user device, and may attempt an authentication or access procedure using a different user's identity. If the man-in-the-middle attack 300 succeeds, the malicious user 320 may gain access to a cloud platform over communication link 315-c or may gain access to authentication or identification information for a user.

In some cases, malicious user 320 may request access to the cloud platform at the same time as the user requesting access (e.g., attempting a man-in-the-middle attack). However, identity server 310 may determine different unique identifiers for malicious user 320 than for the user (e.g., based on an identifier generation function, a random or pseudo-random identifier selection process, etc.). The user and malicious user 320 may each select a unique identifier from the displayed unique identifiers for the authentication process. Identity server 310 may receive authentication requests or unique identifier selection indicators from user device 305-a and malicious user 320 at similar times, and may not be able to determine which request corresponds to the user and which to malicious user 320. Based on the order of receiving the selection indicators, or based on internal processing, the identity server 310 may send an authentication message to user device 305-b for both of these requests. Without the unique identifier selection process, a user may not be able to easily distinguish between the authentication messages displayed in an authentication application at user device 305-b (e.g., the authentication message corresponding to the user device 305-a and the authentication message corresponding to malicious user 320), and may mistakenly confirm authentication for malicious user 320.

However, based on the user selected key authentication process, the user may determine whether the unique identifier selected by the user (e.g., in a first application at user device 305-a) is displayed for the authentication process in the authentication application at user device 305-b. Additionally or alternatively, the user may determine whether the unique identifiers displayed in a first application at user device 305-a match the unique identifiers displayed in the authentication application at user device 305-b. For example, if user device 305-b displays the authentication message corresponding to the authentication procedure by malicious user 320, the unique identifiers displayed in the second application may correspond to the unique identifiers determined and displayed for malicious user 320. In this case, or if the user identifies that the unique identifiers displayed by user device 305-b do not contain the unique identifier selected by the user at user device 305-a, the user may send a rejection message to identity server 310 corresponding to a failed authentication procedure. In some cases, this rejection message may be based on the user making a selection indicating that the authentication application is not displaying the correct unique identifiers or selected unique identifier. Identity server 310 may then send the rejection message to an application from which the authentication procedure was initiated (e.g., the application used by malicious user 320), and may deny access to the cloud platform or deny authentication information for malicious user 320. As described above with reference to FIG. 2, the first and second applications may run on separate user devices 305 (e.g., first application on user device 305-a and second application on user device 305-b) or on the same user device 305 (e.g., both applications on user device 305-a).

In some cases, malicious user 320 may have access to user device 305-a and/or user device 305-b. As such, identity server 310 may display the same unique identifiers for malicious user 320 as part of the authentication procedure. However, malicious user 320 may not input the correct user-specific identifier, as described with reference to FIG. 2 (e.g., a PIN, biometric input, password, etc.). Identity server 310 may recognize the incorrect user-specific identifier and, accordingly, send the rejection message to malicious user 320.

Figure 4A:
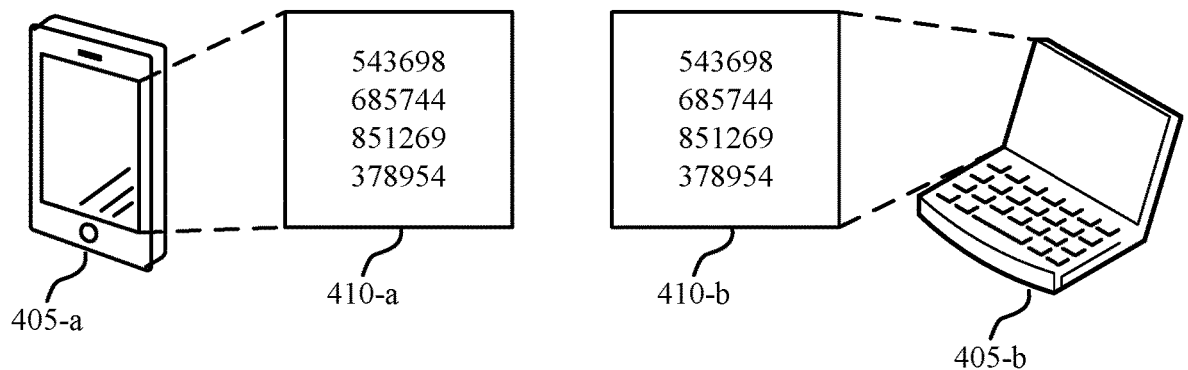
FIGS. 4A, 4B, and 4C illustrate examples of unique identifier configurations that support user selected key authentication in accordance with aspects of the present disclosure.
Figure 4B:
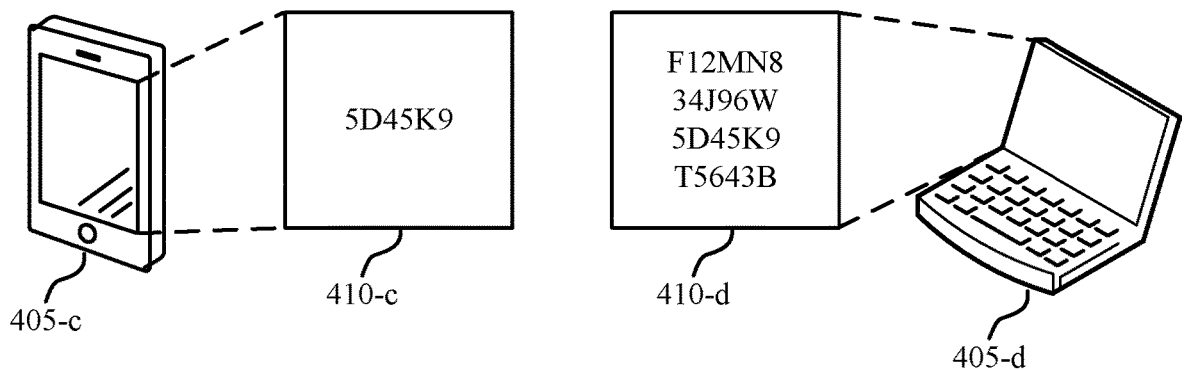
Figure 4C:
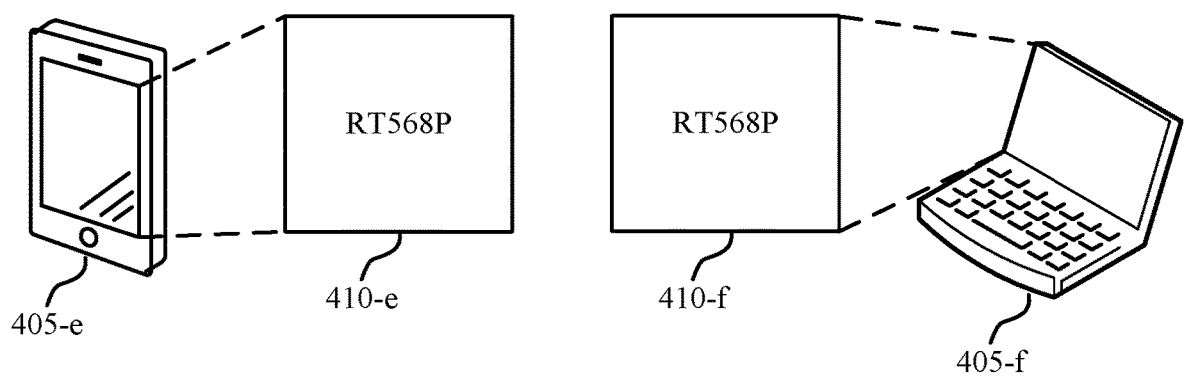

FIGS. 4A, 4B, and 4C illustrate examples of unique identifier configurations 400, 401, and 402, respectively, that support user selected key authentication in accordance with various aspects of the present disclosure. Unique identifier configurations 400, 401, and 402 may include user devices 405, which may be examples of user devices 205 and 305 as described with reference to FIGS. 2 and 3, respectively, as well as cloud clients 105 and contacts 110 as described with reference to FIG. 1. Each user device 405 may have a corresponding display 410, which may be part of a user interface for an application, such as an application 220 or 225 as described with reference to FIG. 2, running on the user device 405. The displays 410 may depict one or more unique identifiers as part of an authentication procedure, as described herein.

Unique identifier configuration 400 may include a first user device 405-a and a second user device 405-b. In some cases, an identity server may run a first application for the authentication procedure on user device 405-a, and a second application for the authentication procedure on user device 405-b. Although not shown, the first and second applications may run on one user device 405 (e.g., user device 405-a). User devices 405 may be in communication with the identity server as part of a user authentication procedure as described above.

In some cases, the identity server may develop multiple unique identifiers (e.g., multiple random strings) and display them on the first application in display 410-a. A user operating user device 405-a may then select one of the unique identifiers (e.g., 685744). After the unique identifier is selected, the identity server may display the same unique identifiers on the second application in display 410-b. The user may verify that the unique identifiers match on both displays 410-a and 410-b, and may select the same unique identifier on display 410-b of the second application as selected on display 410-a of the first application (e.g., 685744). Although shown as random strings of numbers, it is to be understood that the unique identifiers may include numbers, text characters, images, sounds, or a combination thereof. Additionally, it is to be understood that the unique identifier may vary in length from the number of characters shown on displays 410 and the number of unique identifiers displayed may vary (e.g., 3-5 random number strings on each display 410). Furthermore, it is to be understood that the unique identifiers displayed in display 410-b may not match the unique identifiers displayed in display 410-*a*, as long as the selected unique identifier from display 410-*a* is displayed in display 410-*b*. In some cases, the unique identifiers may be generated as part of a generation of an OTP for a user login.

Unique identifier configuration 401 may include a first user device 405-*c* and a second user device 405-*d*. In some cases, a first application for the authentication procedure may run on user device 405-*c*, and a second application for the authentication procedure may run on user device 405-*d*. Although not shown, the first and second applications may run on one user device 405 (e.g., user device 405-*c*). User devices 405 may be in communication with an identity server as part of a user authentication procedure as described above.

In some cases, the identity server may develop (e.g., generate or determine from some list or function) one unique identifier (e.g., one random string) and display it on the first application in display 410-*c* (e.g., 5D45K9). The identity server may then display multiple unique identifiers on the second application in display 410-*b*. The user may select the same unique identifier in display 410-*b* of the second application as displayed in display 410-*a* of the first application (e.g., 5D45K9). Although shown as random strings of numbers and text characters, it is to be understood that the unique identifiers may include numbers, text characters, images, sounds, or a combination thereof. Additionally, it is to be understood that the unique identifier may vary in length from the number of characters shown on displays 410 and the number of unique identifiers on display 410-*d* may vary (e.g., 3-5 unique identifiers). In some cases, the unique identifiers may be generated as part of a generation process for an OTP for user login.

Unique identifier configuration 402 may include a first user device 405-*e* and a second user device 405-*f*. In some cases, a first application for the authentication procedure may run on user device 405-*e*, and a second application for the authentication procedure may run on user device 405-*f*. Although not shown, the first and second applications may run on one user device 405 (e.g., user device 405-*e*). User devices 405 may be in communication with an identity server as part of a user authentication procedure as described above.

In some cases, a user may input the unique identifier in the first application on user device 405-*e*. For example, display 410-*e* may include an input field, in which the user may input the unique identifier (e.g., a string of numbers and text). The identity server may take the input unique identifier and display it on the second application in display 410-*f*. The user may verify that the input unique identifier (e.g., RT568P) from the first application matches the displayed unique identifier on the second application. Additionally, it is to be understood that the unique identifier may vary in length from the number of characters shown on displays 410.

Figure 5:
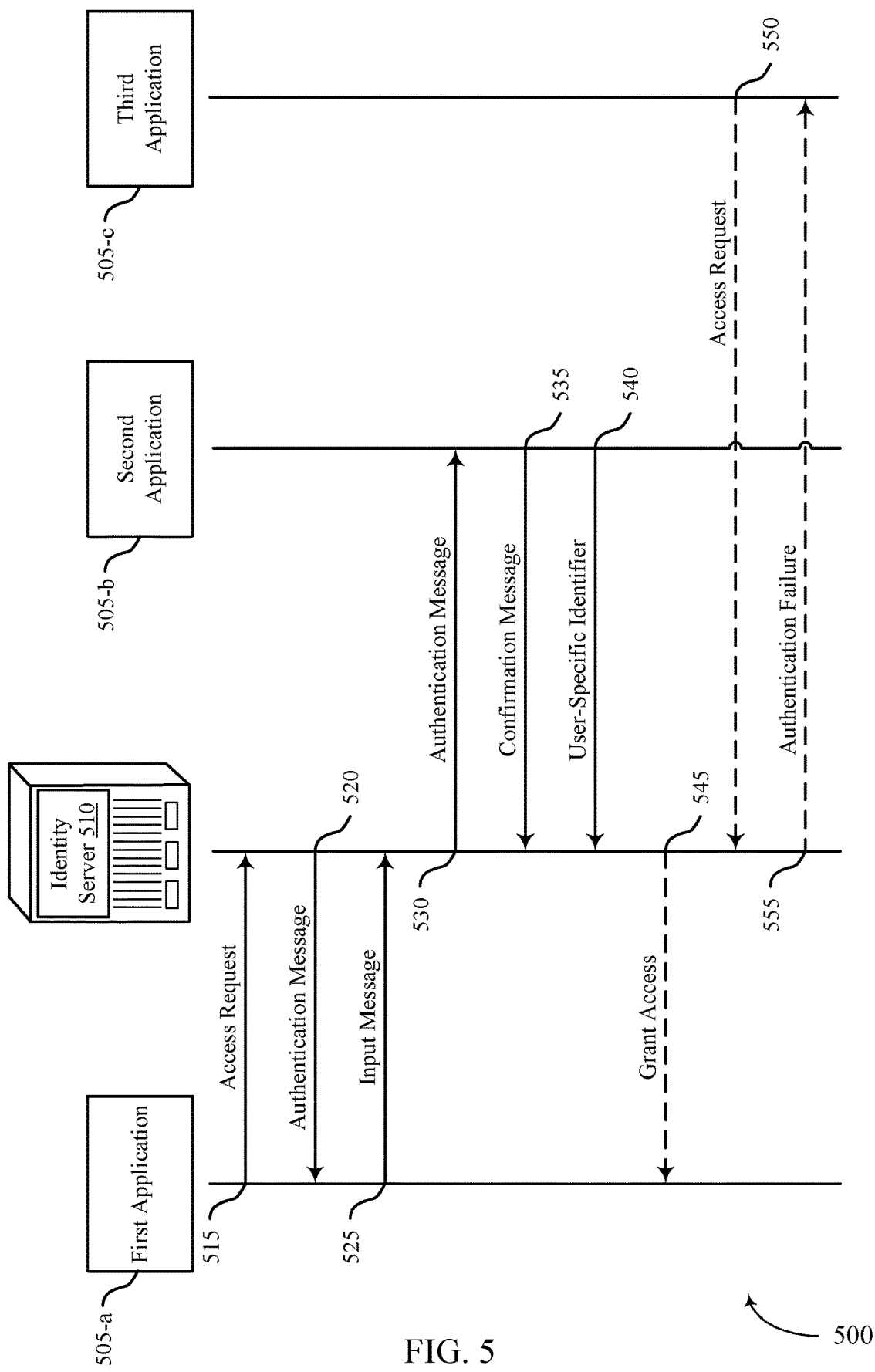
FIG. 5 illustrates an example of a process flow that supports user selected key authentication in accordance with aspects of the present disclosure.

FIG. 5 illustrates an example of a process flow 500 that supports user selected key authentication in accordance with various aspects of the present disclosure. The process flow 500 may include a first application 505-*a*, a second application 505-*b*, a third application 505-*c*, and an identity server 510, which may be examples of applications and identity servers as described with reference to FIGS. 1-4. The process flow 500 may illustrate an authentication procedure for a user attempting to access an application, a cloud platform, or user identification information on the application 505-*a* and second application 505-*b*, while a malicious user attempts to access the user's account at a similar time as the user on third application 505-*c*.

In the following description of the process flow 500, the operations between the first application 505-*a*, second application 505-*b*, third application 505-*c*, and identity server 510 may be performed in different orders or at different times. Certain operations may also be left out of the process flow 500, or other operations may be added to the process flow 500.

At 515, the identity server 510 may receive, from the first application 505-*a*, an access request message associated with a user accessing the first application 505-*a*. At 520, identity server 510 may send a first authentication message to the first application 505-*a* in response to the access request message. In some cases, identity server 510 may generate a plurality of unique identifiers as part of the first authentication message. The unique identifiers may include one or more numbers, text characters, images, sounds, or a combination thereof. Additionally, identity server 510 may generate the plurality of unique identifiers in addition to an OTP that the user may utilize for a login procedure.

At 525, identity server 510 may receive, from the first application 505-*a*, an input message from the user indicating a unique identifier based on the first authentication message. In some cases, the input message from the user may be based on a user selection of the unique identifier from the plurality of unique identifiers generated by identity server 510. Alternatively, the input message from the user may include a user input defining the unique identifier.

At 530, identity server 510 may send a second authentication message to the second application 505-*b*, where the second authentication message indicates the unique identifier. In some cases, the second authentication message may further include a plurality of additional unique identifiers.

At 535, identity server 510 may receive, from the second application 505-*b*, an authentication confirmation message from the user corresponding to the second authentication message based on the input message and the second authentication message both indicating the unique identifier. In some cases, the authentication confirmation message may include an indication that the unique identifier is included in the plurality of additional unique identifiers. Additionally, the authentication confirmation message may be sent to the second application using TLS protocols. Alternatively, the second application 505-*b* may query the authentication confirmation message using TLS protocols (e.g., using a push/pull model).

At 540, identity server 510 may receive, from the second application 505-*b*, a user-specific identifier from the user. The user-specific identifier may include a PIN, a biometric input, a password, or a combination thereof.

At 545, identity server 510 may perform an authentication procedure for the first application 505-*a* based on receiving the authentication confirmation message at the second application 505-*b*. Additionally, the authentication procedure may be based on the user-specific identifier. In some cases, the authentication procedure may grant user access to the first application, determine identification information for the user at the first application 505-*a*, or a combination thereof. Additionally, the authentication procedure may include a challenge response framework.

In some case, a malicious user may attempt to access the user's account on the third application 505-*c* (e.g., performing a man-in-the-middle attack). For example, at 550, identity server 510 may receive, from the third application 505-*c*, an access request from the malicious user. Identity server 510 may send a third authentication message to the second application, where the third authentication message indicates a second unique identifier different than the unique identifier identified in the input message at 525 and associated with the third application 505-*c*. Consequently, identity server 510 may receive, from the second application 505-*b*, a rejection message from the user corresponding to the third authentication message based on the input message and the third authentication message indicating different unique identifiers. At 555, identity server 510 may send an authentication failure message to the third application 505-*c* based on the rejection message.

Figure 6:
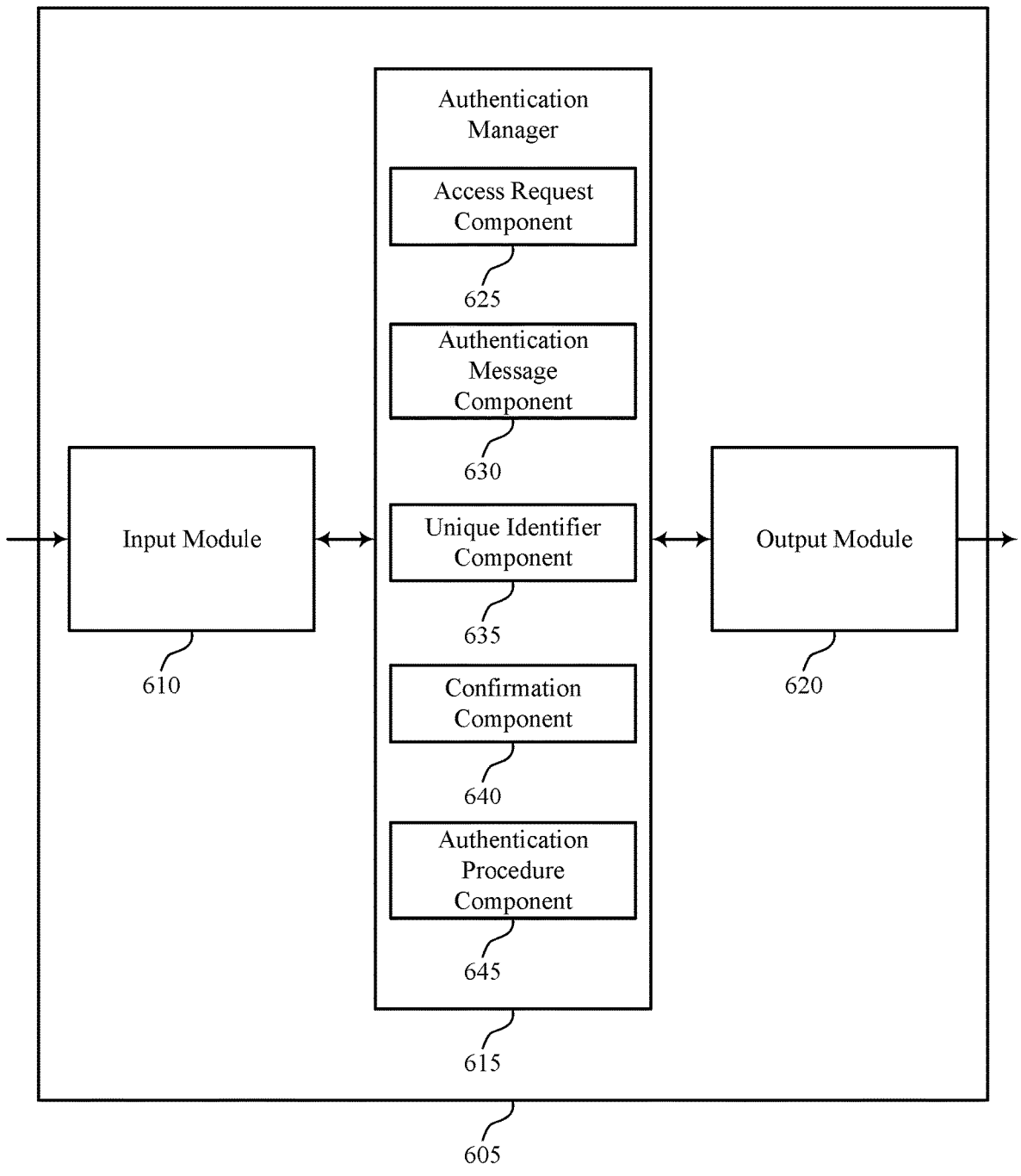
FIGS. 6 and 7 show block diagrams of a device that supports user selected key authentication in accordance with aspects of the present disclosure.

FIG. 6 shows a block diagram 600 of an apparatus 605 that supports user selected key authentication in accordance with aspects of the present disclosure. Apparatus 605 may include input module 610, authentication manager 615, and output module 620. Apparatus 605 may also include a processor. Each of these components may be in communication with one another (e.g., via one or more buses). In some cases, apparatus 605 may be an example of a user terminal, a database server, or a system containing multiple computing devices.

Authentication manager 615 may be an example of aspects of the authentication manager 815 described with reference to FIG. 8.

Authentication manager 615 and/or at least some of its various sub-components may be implemented in hardware, software executed by a processor, firmware, or any combination thereof. If implemented in software executed by a processor, the functions of the authentication manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The authentication manager 615 and/or at least some of its various sub-components may be physically located at various positions, including being distributed such that portions of functions are implemented at different physical locations by one or more physical devices. In some examples, authentication manager 615 and/or at least some of its various sub-components may be a separate and distinct component in accordance with various aspects of the present disclosure. In other examples, authentication manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Authentication manager 615 may also include access request component 625, authentication message component 630, unique identifier component 635, confirmation component 640, and authentication procedure component 645.

Access request component 625 may receive, from a first application, an access request message associated with a user accessing the first application.

Authentication message component 630 may send a first authentication message to the first application in response to the access request message. Additionally, authentication message component 630 may send a second authentication message to a second application, where the second authentication message indicates the unique identifier. In some cases, the second authentication message further includes a set of additional unique identifiers.

Unique identifier component 635 may receive, from the first application, an input message from the user indicating a unique identifier based on the first authentication message, and may generate a set of unique identifiers including the unique identifier, where the first authentication message includes the set of unique identifiers. In some cases, the input message from the user is based on a user selection of the unique identifier from the set of unique identifiers. Alternatively, the input message from the user includes a user input value defining the unique identifier. In some cases, the unique identifier includes one or more numbers, text characters, images, sounds, or a combination thereof.

Confirmation component 640 may receive, from the second application, an authentication confirmation message from the user corresponding to the second authentication message based on the input message and the second authentication message both indicating the unique identifier. In some cases, the authentication confirmation message is sent to the second application using TLS protocols. In some cases, the authentication confirmation message includes an indication that the unique identifier is included in the set of additional unique identifiers.

Authentication procedure component 645 may perform an authentication procedure for the first application based on receiving the authentication confirmation message at the second application. In some cases, the authentication procedure grants user access to the first application, determines identification information for the user at the first application, or a combination thereof.

Figure 7:
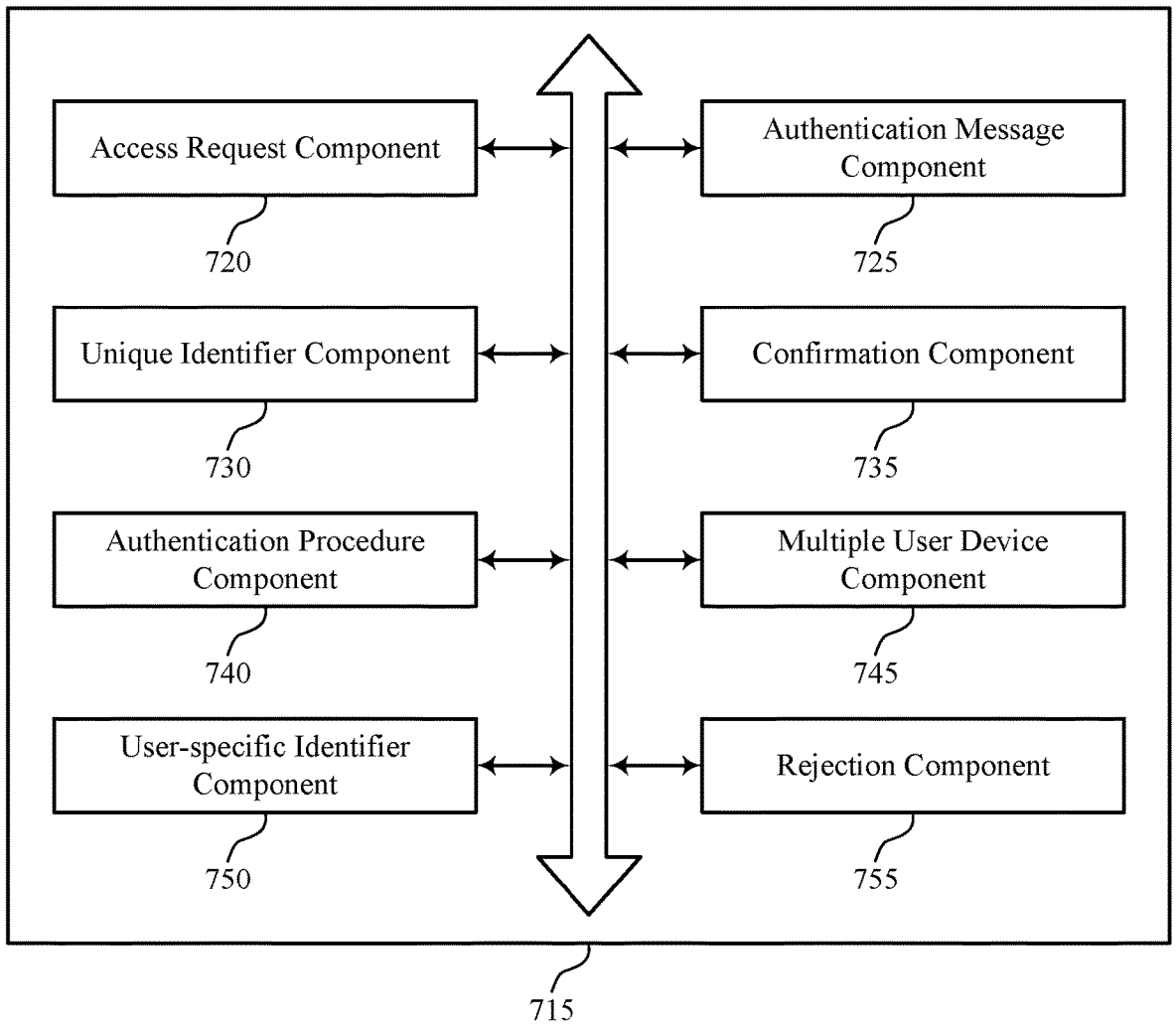

FIG. 7 shows a block diagram 700 of an authentication manager 715 that supports user selected key authentication in accordance with aspects of the present disclosure. The authentication manager 715 may be an example of aspects of an authentication manager 615 or 815 described with reference to FIGS. 6 and 8. The authentication manager 715 may include access request component 720, authentication message component 725, unique identifier component 730, confirmation component 735, authentication procedure component 740, multiple user device component 745, user-specific identifier component 750, and rejection component 755. Each of these modules may communicate, directly or indirectly, with one another (e.g., via one or more buses).

Access request component 720 may receive, from a first application, an access request message associated with a user accessing the first application.

Authentication message component 725 may send a first authentication message to the first application in response to the access request message. Additionally, authentication message component 725 may send a second authentication message to a second application, where the second authentication message indicates the unique identifier. In some cases, the second authentication message further includes a set of additional unique identifiers. In some cases, authentication message component 725 may send a third authentication message to the second application, where the third authentication message indicates a second unique identifier different than the unique identifier and associated with a third application.

Unique identifier component 730 may receive, from the first application, an input message from the user indicating a unique identifier based on the first authentication message, and may generate a set of unique identifiers including the unique identifier, where the first authentication message includes the set of unique identifiers. In some cases, the input message from the user is based on a user selection of the unique identifier from the set of unique identifiers. Alternatively, the input message from the user includes a user input value defining the unique identifier. In some cases, the unique identifier includes one or more numbers, text characters, images, sounds, or a combination thereof.

Confirmation component 735 may receive, from the second application, an authentication confirmation message from the user corresponding to the second authentication message based on the input message and the second authentication message both indicating the unique identifier. In some cases, the authentication confirmation message is sent to the second application using TLS protocols. In some cases, the authentication confirmation message includes an indication that the unique identifier is included in the set of additional unique identifiers.

Authentication procedure component 740 may perform an authentication procedure for the first application based on receiving the authentication confirmation message at the second application. In some cases, the authentication procedure grants user access to the first application, determines identification information for the user at the first application, or a combination thereof.

Multiple user device component 745 may run the first application on a first user device and run the second application on a second user device.

User-specific identifier component 750 may receive, from the second application, a user-specific identifier from the user, where performing the authentication procedure is based on the user-specific identifier. In some cases, the user-specific identifier includes a PIN, a biometric input, a password, or a combination thereof.

Rejection component 755 may receive, from the second application, a rejection message from the user corresponding to the third authentication message based on the input message and the third authentication message indicating different unique identifiers and send an authentication failure message to the third application based on the rejection message.

Figure 8:
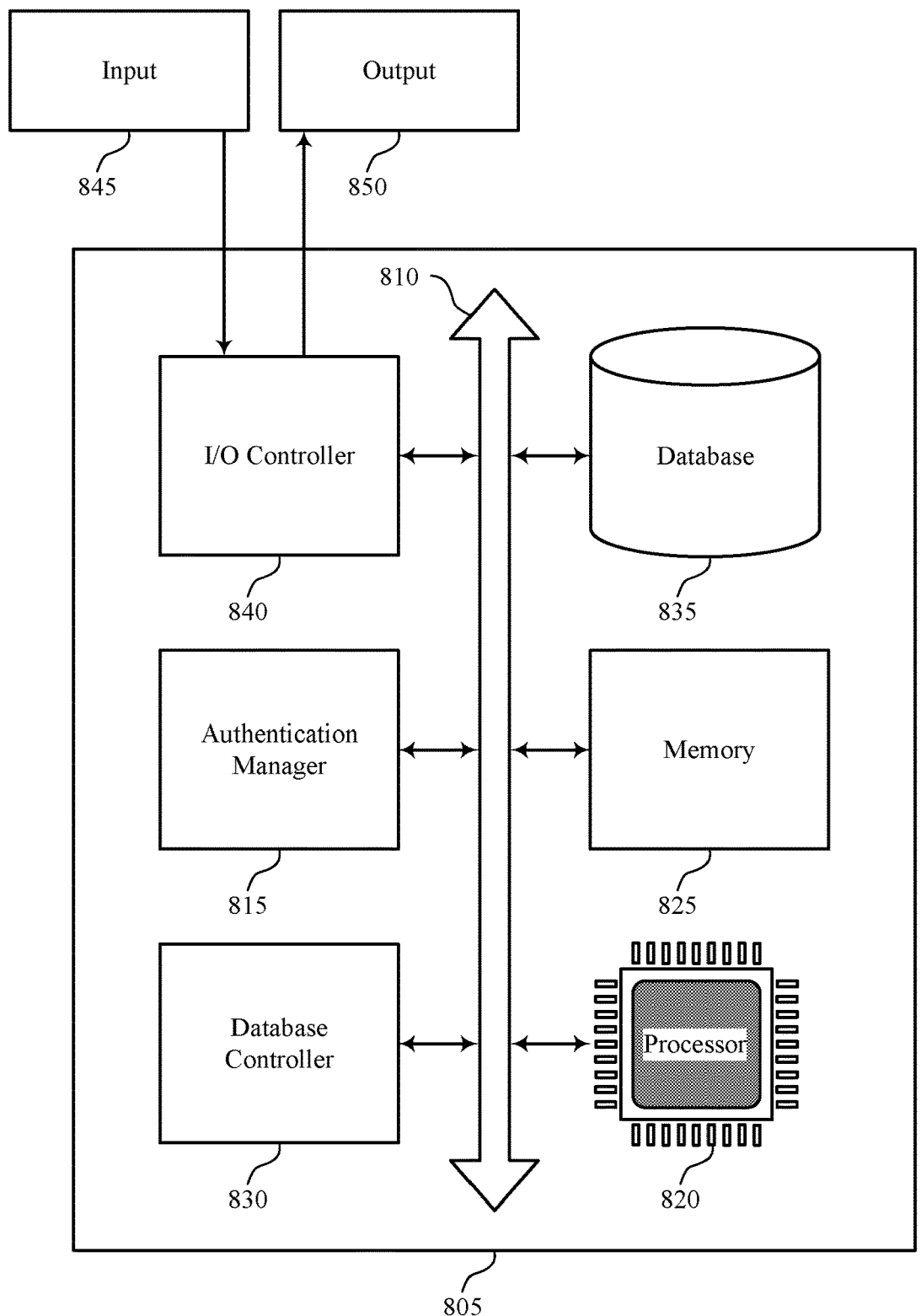
FIG. 8 illustrates a block diagram of a system including an identity server that supports user selected key authentication in accordance with aspects of the present disclosure.

FIG. 8 shows a diagram of a system 800 including a device 805 that supports user selected key authentication in accordance with aspects of the present disclosure. Device 805 may be an example of or include the components of identity server 210, 310, or 510 as described herein, e.g., with reference to FIGS. 2, 3, and 5. Device 805 may include components for bi-directional data communications including components for transmitting and receiving communications, including authentication manager 815, processor 820, memory 825, database controller 830, database 835, and I/O controller 840. These components may be in electronic communication via one or more buses (e.g., bus 810).

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting user selected key authentication).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Database controller 830 may manage data storage and processing in database 835. In some cases, a user may interact with database controller 830. In other cases, database controller 830 may operate automatically without user interaction. Database 835 may be an example of a single database, a distributed database, multiple distributed databases, or an emergency backup database.

I/O controller 840 may manage input and output signals for device 805. I/O controller 840 may also manage peripherals not integrated into device 805. In some cases, I/O controller 840 may represent a physical connection or port to an external peripheral. In some cases, I/O controller 840 may utilize an operating system such as iOS®, ANDROID®, MS-DOS®, MS-WINDOWS®, OS/2®, UNIX®, LINUX®, or another known operating system. In other cases, I/O controller 840 may represent or interact with a modem, a keyboard, a mouse, a touchscreen, or a similar device. In some cases, I/O controller 840 may be implemented as part of a processor. In some cases, a user may interact with device 805 via I/O controller 840 or via hardware components controlled by I/O controller 840.

Figure 9:
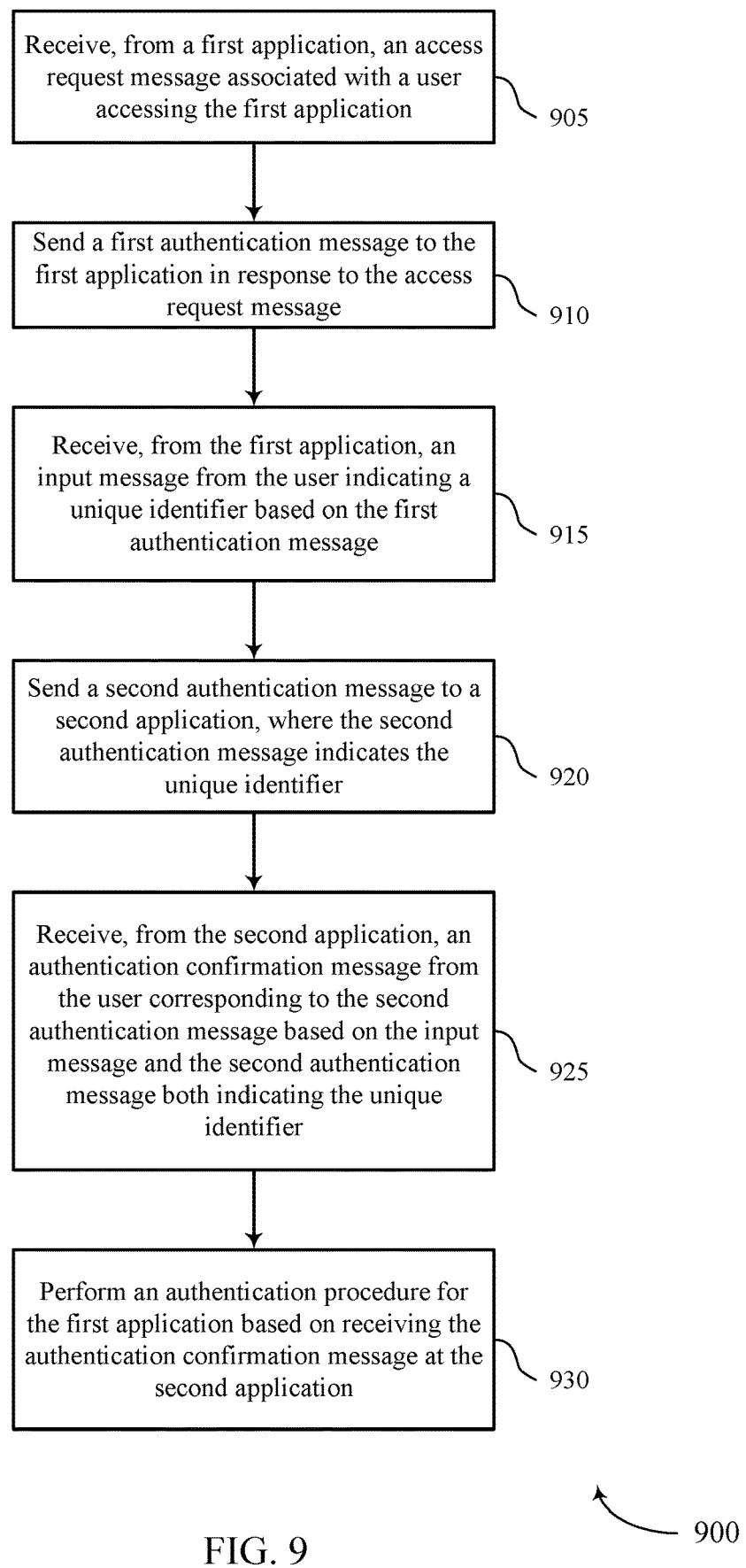
FIGS. 9 through 11 illustrate methods for user selected key authentication in accordance with aspects of the present disclosure.

FIG. 9 shows a flowchart illustrating a method 900 for user selected key authentication in accordance with aspects of the present disclosure. The operations of method 900 may be implemented by an identity server 210, 310, or 510 or its components as described herein, e.g., with reference to FIGS. 2, 3, and 5. For example, the operations of method 900 may be performed by an authentication manager as described with reference to FIGS. 6 through 8. In some examples, an identity server may execute a set of codes to control the functional elements of the device to perform the functions described below. Additionally or alternatively, the identity server may perform aspects of the functions described below using special-purpose hardware.

At 905 the identity server may receive, from a first application, an access request message associated with a user accessing the first application. The operations of 905 may be performed according to the methods described herein. In certain examples, aspects of the operations of 905 may be performed by an access request component as described with reference to FIGS. 6 through 8.

At 910 the identity server may send a first authentication message to the first application in response to the access request message. The operations of 910 may be performed according to the methods described herein. In certain examples, aspects of the operations of 910 may be performed by an authentication message component as described with reference to FIGS. 6 through 8.

At 915 the identity server may receive, from the first application, an input message from the user indicating a unique identifier based at least in part on the first authentication message. The operations of 915 may be performed according to the methods described herein. In certain examples, aspects of the operations of 915 may be performed by a unique identifier component as described with reference to FIGS. 6 through 8.

At 920 the identity server may send a second authentication message to a second application, wherein the second authentication message indicates the unique identifier. The operations of 920 may be performed according to the methods described herein. In certain examples, aspects of the operations of 920 may be performed by an authentication message component as described with reference to FIGS. 6 through 8.

At 925 the identity server may receive, from the second application, an authentication confirmation message from the user corresponding to the second authentication message based at least in part on the input message and the second authentication message both indicating the unique identifier. The operations of 925 may be performed according to the methods described herein. In certain examples, aspects of the operations of 925 may be performed by a confirmation component as described with reference to FIGS. 6 through 8.

At 930 the identity server may perform an authentication procedure for the first application based at least in part on receiving the authentication confirmation message at the second application. The operations of 930 may be performed according to the methods described herein. In certain examples, aspects of the operations of 930 may be performed by an authentication procedure component as described with reference to FIGS. 6 through 8.

Figure 10:
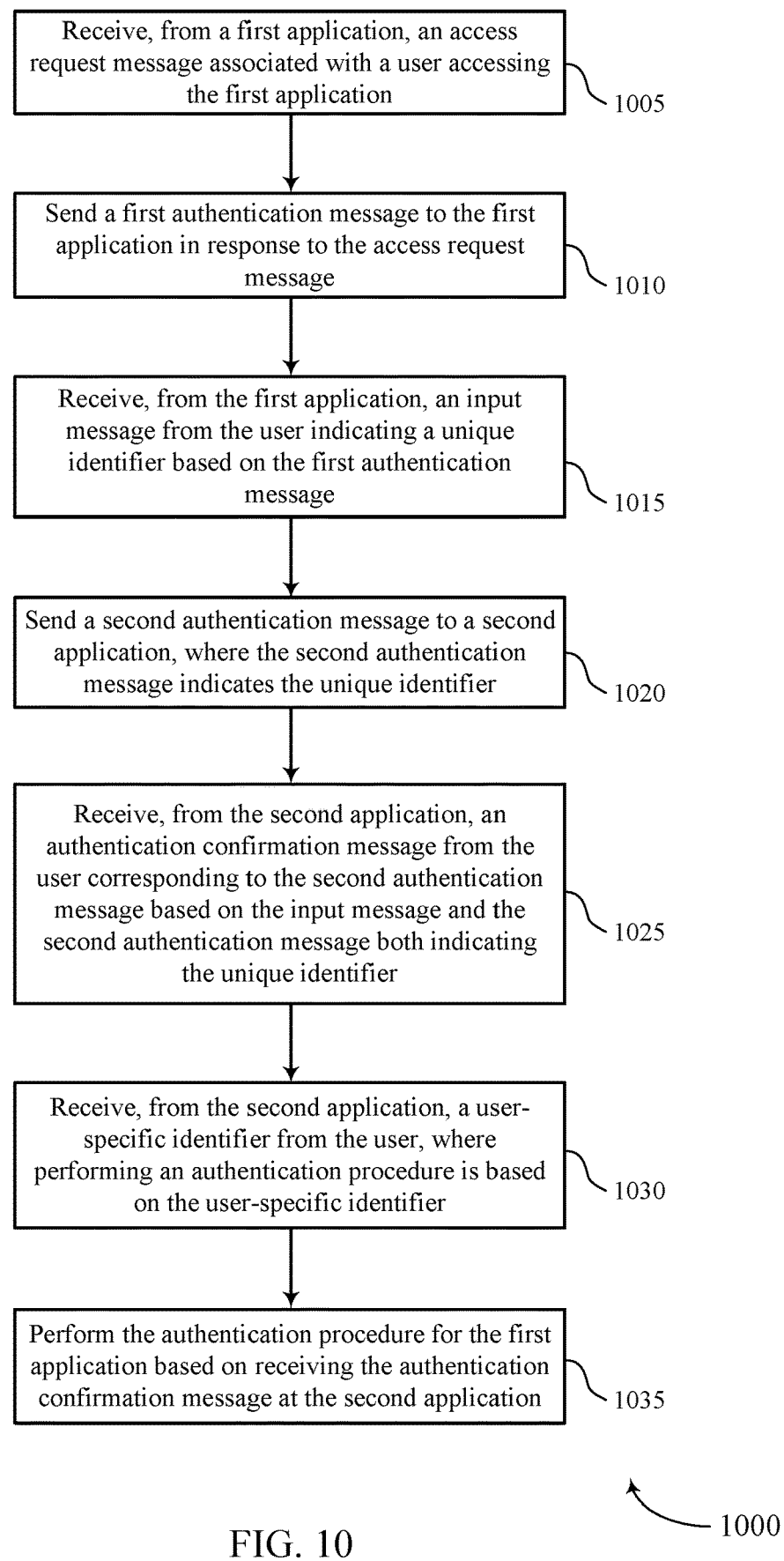

FIG. 10 shows a flowchart illustrating a method 1000 for user selected key authentication in accordance with aspects of the present disclosure. The operations of method 1000 may be implemented by an identity server 210, 310, or 510 or its components as described herein, e.g., with reference to FIGS. 2, 3, and 5. For example, the operations of method 1000 may be performed by an authentication manager as described with reference to FIGS. 6 through 8. In some examples, an identity server may execute a set of codes to control the functional elements of the device to perform the functions described below. Additionally or alternatively, the identity server may perform aspects of the functions described below using special-purpose hardware.

At 1005 the identity server may receive, from a first application, an access request message associated with a user accessing the first application. The operations of 1005 may be performed according to the methods described herein. In certain examples, aspects of the operations of 1005 may be performed by an access request component as described with reference to FIGS. 6 through 8.

At 1010 the identity server may send a first authentication message to the first application in response to the access request message. The operations of 1010 may be performed according to the methods described herein. In certain examples, aspects of the operations of 1010 may be performed by an authentication message component as described with reference to FIGS. 6 through 8.

At 1015 the identity server may receive, from the first application, an input message from the user indicating a unique identifier based at least in part on the first authentication message. The operations of 1015 may be performed according to the methods described herein. In certain examples, aspects of the operations of 1015 may be performed by a unique identifier component as described with reference to FIGS. 6 through 8.

At 1020 the identity server may send a second authentication message to a second application, wherein the second authentication message indicates the unique identifier. The operations of 1020 may be performed according to the methods described herein. In certain examples, aspects of the operations of 1020 may be performed by an authentication message component as described with reference to FIGS. 6 through 8.

At 1025 the identity server may receive, from the second application, an authentication confirmation message from the user corresponding to the second authentication message based at least in part on the input message and the second authentication message both indicating the unique identifier. The operations of 1025 may be performed according to the methods described herein. In certain examples, aspects of the operations of 1025 may be performed by a confirmation component as described with reference to FIGS. 6 through 8.

At 1030 the identity server may receive, from the second application, a user-specific identifier from the user, wherein performing an authentication procedure is based at least in part on the user-specific identifier. The operations of 1030 may be performed according to the methods described herein. In certain examples, aspects of the operations of 1030 may be performed by a user-specific identifier component as described with reference to FIGS. 6 through 8.

At 1035 the identity server may perform the authentication procedure for the first application based at least in part on receiving the authentication confirmation message and user-specific identifier at the second application. The operations of 1035 may be performed according to the methods described herein. In certain examples, aspects of the operations of 1035 may be performed by an authentication procedure component as described with reference to FIGS. 6 through 8.

Figure 11:
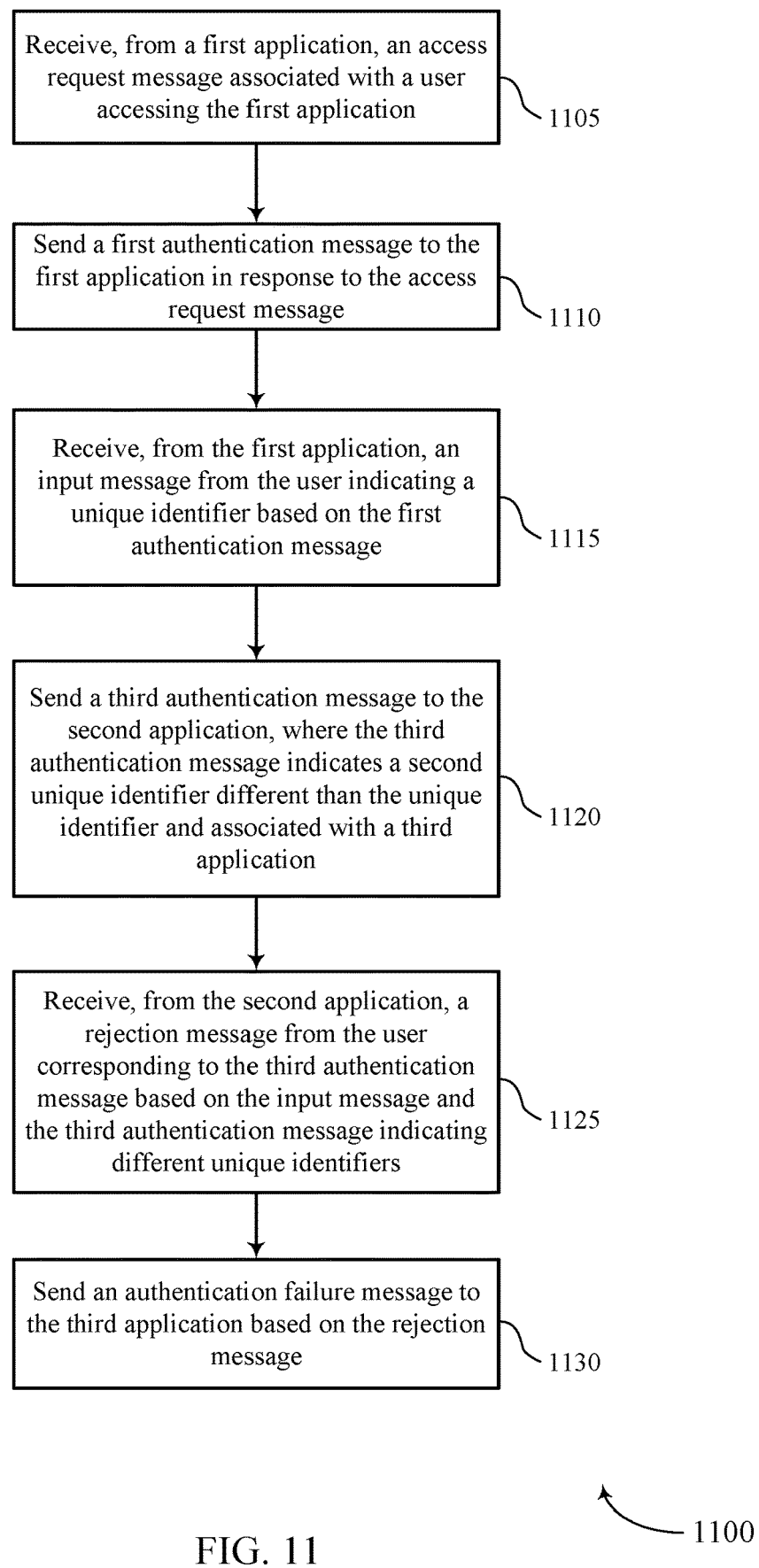

FIG. 11 shows a flowchart illustrating a method 1100 for user selected key authentication in accordance with aspects of the present disclosure. The operations of method 1100 may be implemented by an identity server 210, 310, or 510 or its components as described herein, e.g., with reference to FIGS. 2, 3, and 5. For example, the operations of method 1100 may be performed by an authentication manager as described with reference to FIGS. 6 through 8. In some examples, an identity server may execute a set of codes to control the functional elements of the device to perform the functions described below. Additionally or alternatively, the identity server may perform aspects of the functions described below using special-purpose hardware.

At 1105 the identity server may receive, from a first application, an access request message associated with a user accessing the first application. The operations of 1105 may be performed according to the methods described herein. In certain examples, aspects of the operations of 1105 may be performed by an access request component as described with reference to FIGS. 6 through 8.

At 1110 the identity server may send a first authentication message to the first application in response to the access request message. The operations of 1110 may be performed according to the methods described herein. In certain examples, aspects of the operations of 1110 may be performed by an authentication message component as described with reference to FIGS. 6 through 8.

At 1115 the identity server may receive, from the first application, an input message from the user indicating a unique identifier based at least in part on the first authentication message. The operations of 1115 may be performed according to the methods described herein. In certain examples, aspects of the operations of 1115 may be performed by a unique identifier component as described with reference to FIGS. 6 through 8.

At 1120 the identity server may send a third authentication message to the second application, wherein the third authentication message indicates a second unique identifier different than the unique identifier and associated with a third application. The operations of 1120 may be performed according to the methods described herein. In certain examples, aspects of the operations of 1120 may be performed by an authentication message component as described with reference to FIGS. 6 through 8.

At 1125 the identity server may receive, from the second application, a rejection message from the user corresponding to the third authentication message based at least in part on the input message and the third authentication message indicating different unique identifiers. The operations of 1125 may be performed according to the methods described herein. In certain examples, aspects of the operations of 1125 may be performed by a rejection component as described with reference to FIGS. 6 through 8.

At 1130 the identity server may send an authentication failure message to the third application based at least in part on the rejection message. The operations of 1130 may be performed according to the methods described herein. In certain examples, aspects of the operations of 1130 may be performed by a rejection component as described with reference to FIGS. 6 through 8.

A method of user authentication is described. The method may include receiving, from a first application, an access request message associated with a user accessing the first application, sending a first authentication message to the first application in response to the access request message, and receiving, from the first application, an input message from the user indicating a unique identifier based at least in part on the first authentication message. The method may further include sending a second authentication message to a second application, wherein the second authentication message indicates the unique identifier, receiving, from the second application, an authentication confirmation message from the user corresponding to the second authentication message based at least in part on the input message and the second authentication message both indicating the unique identifier, and performing an authentication procedure for the first application based at least in part on receiving the authentication confirmation message at the second application.

An apparatus for user authentication is described. The apparatus may include a processor, memory in electronic communication with the processor, and instructions stored in the memory. The instructions may be executable by the processor to cause the apparatus to receive, from a first application, an access request message associated with a user accessing the first application, send a first authentication message to the first application in response to the access request message, and receive, from the first application, an input message from the user indicating a unique identifier based at least in part on the first authentication message. The instructions may be further executable by the processor to cause the apparatus to send a second authentication message to a second application, wherein the second authentication message indicates the unique identifier, receive, from the second application, an authentication confirmation message from the user corresponding to the second authentication message based at least in part on the input message and the second authentication message both indicating the unique identifier, and perform an authentication procedure for the first application based at least in part on receiving the authentication confirmation message at the second application.

A non-transitory computer-readable medium for user authentication is described. The non-transitory computer-readable medium may include instructions executable by a processor to receive, from a first application, an access request message associated with a user accessing the first application, send a first authentication message to the first application in response to the access request message, and receive, from the first application, an input message from the user indicating a unique identifier based at least in part on the first authentication message. The instructions may be further executable by the processor to send a second authentication message to a second application, wherein the second authentication message indicates the unique identifier, receive, from the second application, an authentication confirmation message from the user corresponding to the second authentication message based at least in part on the input message and the second authentication message both indicating the unique identifier, and perform an authentication procedure for the first application based at least in part on receiving the authentication confirmation message at the second application.

Some examples of the method, apparatus, and non-transitory computer-readable medium described above may further include processes, features, means, or instructions for generating a plurality of unique identifiers comprising the unique identifier, wherein the first authentication message comprises the plurality of unique identifiers, and wherein the input message from the user may be based at least in part on a user selection of the unique identifier from the plurality of unique identifiers.

In some examples of the method, apparatus, and non-transitory computer-readable medium described above, the input message from the user comprises a user input value defining the unique identifier.

In some examples of the method, apparatus, and non-transitory computer-readable medium described above, the authentication confirmation message may be sent to the second application using TLS protocols.

Some examples of the method, apparatus, and non-transitory computer-readable medium described above may further include processes, features, means, or instructions for running the first application on a first user device. Some examples of the method, apparatus, and non-transitory computer-readable medium described above may further include processes, features, means, or instructions for running the second application on a second user device.

Some examples of the method, apparatus, and non-transitory computer-readable medium described above may further include processes, features, means, or instructions for receiving, from the second application, a user-specific identifier from the user, wherein performing the authentication procedure may be based at least in part on the user-specific identifier. In some examples of the method, apparatus, and non-transitory computer-readable medium described above, the user-specific identifier comprises a PIN, a biometric input, a password, or a combination thereof.

Some examples of the method, apparatus, and non-transitory computer-readable medium described above may further include processes, features, means, or instructions for sending a third authentication message to the second application, wherein the third authentication message indicates a second unique identifier different than the unique identifier and associated with a third application. Some examples of the method, apparatus, and non-transitory computer-readable medium described above may further include processes, features, means, or instructions for receiving, from the second application, a rejection message from the user corresponding to the third authentication message based at least in part on the input message and the third authentication message indicating different unique identifiers. Some examples of the method, apparatus, and non-transitory computer-readable medium described above may further include processes, features, means, or instructions for sending an authentication failure message to the third application based at least in part on the rejection message.

In some examples of the method, apparatus, and non-transitory computer-readable medium described above, the unique identifier comprises one or more numbers, text characters, images, sounds, or a combination thereof.

In some examples of the method, apparatus, and non-transitory computer-readable medium described above, the second authentication message further comprises a plurality of additional unique identifiers. In some examples of the method, apparatus, and non-transitory computer-readable medium described above, the authentication confirmation message comprises an indication that the unique identifier may be included in the plurality of additional unique identifiers.

In some examples of the method, apparatus, and non-transitory computer-readable medium described above, the authentication procedure grants user access to the first application, determines identification information for the user at the first application, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for user authentication, comprising:
receiving, from a first application, an access request message associated with a user accessing the first application;
sending a first authentication message to the first application in response to the access request message, wherein the first authentication message comprises a plurality of unique identifiers;
receiving, from the first application, an input message from the user indicating a selection by the user of a unique identifier from the plurality of unique identifiers;
sending a second authentication message to a second application in response to receiving the input message, wherein the second authentication message indicates the unique identifier received from the first application;
receiving, from the second application, an authentication confirmation message from the user corresponding to the second authentication message based at least in part on the input message and the second authentication message both indicating the unique identifier of the plurality of unique identifiers; and
performing an authentication procedure for the first application based at least in part on receiving the authentication confirmation message at the second application.

2. The method of claim 1, further comprising:
generating the plurality of unique identifiers comprising the unique identifier.

3. The method of claim 1, wherein the input message from the user comprises a user input value defining the unique identifier.

4. The method of claim 1, wherein the authentication confirmation message is sent to the second application using transport layer security (TLS) protocols.

5. The method of claim 4, further comprising:
running the first application on a first user device; and
running the second application on a second user device.

6. The method of claim 1, further comprising:
receiving, from the second application, a user-specific identifier from the user, wherein performing the authentication procedure is based at least in part on the user-specific identifier.

7. The method of claim 6, wherein the user-specific identifier comprises a personal identification number (PIN), a biometric input, a password, or a combination thereof.

8. The method of claim 1, further comprising:
sending a third authentication message to the second application, wherein the third authentication message indicates a second unique identifier different than the unique identifier and associated with a third application;
receiving, from the second application, a rejection message from the user corresponding to the third authentication message based at least in part on the input message and the third authentication message indicating different unique identifiers; and
sending an authentication failure message to the third application based at least in part on the rejection message.

9. The method of claim 1, wherein the unique identifier comprises one or more numbers, text characters, images, sounds, or a combination thereof.

10. The method of claim 1, wherein:
the second authentication message further comprises a plurality of additional unique identifiers; and
the authentication confirmation message comprises an indication that the unique identifier is included in the plurality of additional unique identifiers.

11. The method of claim 1, wherein the authentication procedure grants user access to the first application, determines identification information for the user at the first application, or a combination thereof.

12. An apparatus for user authentication, comprising:
a processor;
memory in electronic communication with the processor; and
instructions stored in the memory and executable by the processor to cause the apparatus to:
receive, from a first application, an access request message associated with a user accessing the first application;
send a first authentication message to the first application in response to the access request message, wherein the first authentication message comprises a plurality of unique identifiers;
receive, from the first application, an input message from the user indicating a selection by the user of a unique identifier from the plurality of unique identifiers;
send a second authentication message to a second application in response to receiving the input message, wherein the second authentication message indicates the unique identifier received from the first application;
receive, from the second application, an authentication confirmation message from the user corresponding to the second authentication message based at least in part on the input message and the second authentication message both indicating the unique identifier of the plurality of unique identifiers; and
perform an authentication procedure for the first application based at least in part on receiving the authentication confirmation message at the second application.

13. The apparatus of claim 12, wherein the instructions are further executable by the processor to cause the apparatus to:
generate the plurality of unique identifiers comprising the unique identifier.

14. The apparatus of claim 12, wherein the input message from the user comprises a user input value defining the unique identifier.

15. The apparatus of claim 12, wherein the authentication confirmation message is sent to the second application using transport layer security (TLS) protocols.

16. The apparatus of claim 15, wherein the instructions are further executable by the processor to cause the apparatus to:
run the first application on a first user device; and
run the second application on a second user device.

17. The apparatus of claim 12, wherein the instructions are further executable by the processor to cause the apparatus to:
receive, from the second application, a user-specific identifier from the user, wherein performing the authentication procedure is based at least in part on the user-specific identifier.

18. The apparatus of claim 17, wherein the user-specific identifier comprises a personal identification number (PIN), a biometric input, a password, or a combination thereof.

19. The apparatus of claim 12, wherein the instructions are further executable by the processor to cause the apparatus to:

send a third authentication message to the second application, wherein the third authentication message indicates a second unique identifier different than the unique identifier and associated with a third application;

receive, from the second application, a rejection message from the user corresponding to the third authentication message based at least in part on the input message and the third authentication message indicating different unique identifiers; and send an authentication failure message to the third application based at least in part on the rejection message.

20. A non-transitory computer-readable medium storing code for user authentication, the code comprising instructions executable by a processor to:

receive, from a first application, an access request message associated with a user accessing the first application;

send a first authentication message to the first application in response to the access request message, wherein the first authentication message comprises a plurality of unique identifiers;

receive, from the first application, an input message from the user indicating a selection by the user of a unique identifier from the plurality of unique identifiers;

send a second authentication message to a second application in response to receiving the input message, wherein the second authentication message indicates the unique identifier received from the first application;

receive, from the second application, an authentication confirmation message from the user corresponding to the second authentication message based at least in part on the input message and the second authentication message both indicating the unique identifier of the plurality of unique identifiers; and perform an authentication procedure for the first application based at least in part on receiving the authentication confirmation message at the second application.

* * * * *